US009252641B2

(12) United States Patent
Ishizuka

(10) Patent No.: US 9,252,641 B2
(45) Date of Patent: Feb. 2, 2016

(54) POWER TRANSMISSION DEVICE

(71) Applicant: Sumitomo Heavy Industries, Ltd., Tokyo (JP)

(72) Inventor: Masayuki Ishizuka, Kanagawa (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 450 days.

(21) Appl. No.: 13/774,207

(22) Filed: Feb. 22, 2013

(65) Prior Publication Data

US 2013/0221777 A1    Aug. 29, 2013

(30) Foreign Application Priority Data

Feb. 23, 2012  (JP) .................................. 2012-037240

(51) Int. Cl.
| | |
|---|---|
| *H02K 7/102* | (2006.01) |
| *H02K 9/19* | (2006.01) |
| *B60K 7/00* | (2006.01) |
| *H02K 7/116* | (2006.01) |

(52) U.S. Cl.
CPC .............. *H02K 7/102* (2013.01); *H02K 7/1028* (2013.01); *H02K 7/116* (2013.01); *H02K 9/19* (2013.01)

(58) Field of Classification Search
CPC ....... H02K 1/27; H02K 1/2706; H02K 7/102; H02K 7/108; H02K 7/112; H02K 7/116; H02K 7/1163; B60K 7/0007; B60K 2007/0092
USPC ......................................................... 310/77
See application file for complete search history.

(56) References Cited

U.S. PATENT DOCUMENTS

| | | | | |
|---|---|---|---|---|
| 5,014,800 A | * | 5/1991 | Kawamoto et al. | 180/65.51 |
| 5,087,229 A | * | 2/1992 | Hewko et al. | 475/149 |
| 5,156,579 A | * | 10/1992 | Wakuta et al. | 475/161 |
| 6,965,186 B2 | * | 11/2005 | Fukuda et al. | 310/261.1 |
| 2007/0225098 A1 | | 9/2007 | Tabata et al. | |

FOREIGN PATENT DOCUMENTS

| | | | | |
|---|---|---|---|---|
| DE | 10061221 | * | 6/2002 | B60K 1/00 |
| EP | 2495122 | * | 3/2012 | B60K 17/04 |
| JP | 2006077634 A | | 3/2006 | |
| JP | 2006-89000 A | | 4/2006 | |

OTHER PUBLICATIONS

Patent Abstracts of Japan, Publication No. 2006077634, Date of Publication: Mar. 23, 2006 (1 Page).

* cited by examiner

*Primary Examiner* — Burton Mullins
(74) *Attorney, Agent, or Firm* — Buchanan Ingersoll & Rooney PC

(57) ABSTRACT

A power transmission device includes a motor including a rotor having a first axial side, a second axial side opposite the first axial side, a permanent magnet embedded therein and a stator, and configured to generate a rotational force. A reducer is configured to transmit the rotational force of the motor. A wet brake mechanism is provided on the first axial side of the rotor and is configured to brake the rotation of the motor. Spaces accommodating the motor, the reducer, and the wet brake mechanism communicate with each other so that lubricant oil can flow through the spaces. A leakage magnetic flux at a second axial end face on the second axial side of the rotor is greater than a leakage magnetic flux at a first axial end face on the first axial side of the rotor having the wet brake mechanism.

3 Claims, 3 Drawing Sheets

POWER TRANSMISSION DEVICE

BACKGROUND OF THE INVENTION

1. Field of the Invention

The present invention relates to a power transmission device.

2. Description of the Related Art

Oil bath motors are structured such that a motor and a reducer are encapsulated in spaces communicating with each other and lubricant oil is circulated in the spaces. In an oil bath motor such as this, metal powder created as a result of sliding motion between components may be circulated along with the lubricant oil and supplied to the slide portions with the result that the slide portions may be unusually abraded.

One prior art discloses a compressor comprising: a power device composed of a stator and a rotor having a permanent magnet embedded therein; an airtight container for storing lubricant oil; and an oil feeding mechanism for pumping the lubricant oil stored in the airtight container so as to circulate the lubricant, wherein a through hole in which the lubricant flows is formed by drilling the rotor so as to be integrated with an air gap portion in which the permanent magnet is embedded. This allows iron powder mixed with the lubricant oil and circulated to be captured by the permanent magnet.

SUMMARY OF THE INVENTION

The power transmission device according to one aspect of the present invention comprises: a motor including a rotor having a first axial side, a second axial side opposite the first axial side, a permanent magnet embedded therein and a stator, and configured to generate a rotational force; a reducer configured to transmit the rotational force of the motor; and a wet brake mechanism provided on the first axial side of the rotor and configured to brake on the rotation of the motor.

Spaces accommodating the motor, the reducer, and the wet brake mechanism communicate with each other so that lubricant oil can flow through the spaces, and a leakage magnetic flux at a second axial end face on the second axial side of the rotor is greater than a leakage magnetic flux at a first axial end face on the first axial side of the rotor having the wet brake mechanism.

Optional combinations of the aforementioned constituting elements, and implementations of the invention in the form of methods, apparatuses, and systems may also be practiced as additional modes of the present invention.

BRIEF DESCRIPTION OF THE DRAWINGS

Embodiments will now be described, by way of example only, with reference to the accompanying drawings, which are meant to be exemplary, not limiting, and wherein like elements are numbered alike in several figures, in which.

DETAILED DESCRIPTION OF THE INVENTION

The invention will now be described by reference to the preferred embodiments. This does not intend to limit the scope of the present invention, but to exemplify the invention.

Some power transmission devices that use an oil bath motor as an engine are provided with a wet brake mechanism configured to produce a braking force by causing friction plates to be in contact with each other. By applying the technology of the prior art to the power transmission device as described above, iron powder attracted by the permanent magnet will be supplied to the neighborhood of the friction plates with the result that the friction plates may be unusually abraded.

In this background, there is a need to provide a technology capable of capturing metal powder in the lubricant oil and reducing abrasion of friction plates of a brake mechanism in a power transmission device of a structure in which the motor, the reducer, and the brake mechanism are soaked in an oil bath.

Figure 1:
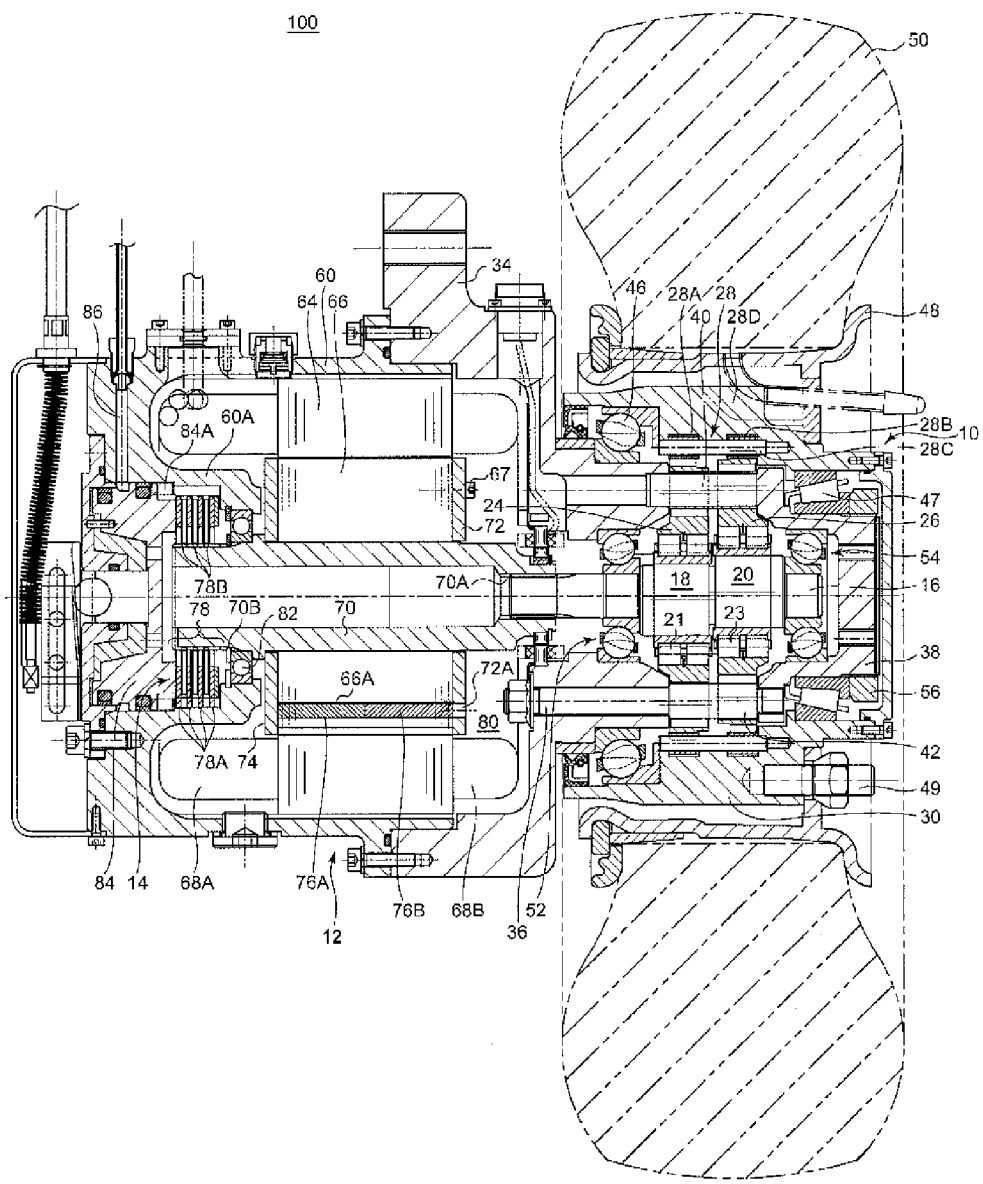
FIG. 1 shows the structure of a power transmission device according to one embodiment of the present invention.

FIG. 1 shows the structure of a power transmission device 100 according to one embodiment of the present invention embedded in a wheel of a forklift. FIG. 1 is a cross section that results when the power transmission device 100 is severed by a vertical plane that includes the central axis of the device 100.

The power transmission device 100 comprises a reducer 10, an interior permanent magnet (IPM) motor 12, and a brake mechanism 14, and is used to drive the wheels of a utility vehicle independently.

The reducer 10 is a kind of planetary gear reducer of eccentric oscillation and meshing type. An input shaft 16 is located at the radial center of externally-toothed gears 24 and 26 described later. Two eccentric bodies 18 and 20 eccentric relative to the input shaft 16 are formed so as to be integrated with the input shaft 16. The two eccentric bodies 18 and 20 are eccentric relative to each other by a phase difference of 180°. The eccentric bodies 18 and 20 may be configured as components independent of the input shaft 16 and fixed to the input shaft 16 using a key, etc.

Two externally-toothed gears 24 and 26 are oscillatably fitted to the outer periphery of the eccentric bodies 18 and 20, respectively, via roller bearings 21 and 23. The externally-toothed gears 24 and 26 internally mesh with an internally-toothed gear 28.

The internally-toothed gear 28 primarily comprises cylindrical internal gear pins 28A and 28B forming internally-toothed gears, retention pins 28C extending through the internal gear pins 28A and 28B and rotatably retaining the pins 28A and 28B, and an internally-toothed gear body 28D rotatably retaining the retention pins 28C and integrated with a casing 30.

A first carrier body 34 fixed to a vehicle frame (not shown) is located at the axial end of the externally-toothed gears 24 and 26 toward the vehicle. At the axial end of the externally-toothed gears 24 and 26 away from the vehicle is located a second carrier body 38 integrated with the first carrier body 24 via carrier bolts 36 and carrier pins 42. Internal pins 40 are formed to be integrated with the second carrier body 38.

Twelve through holes having the equal diameter are formed at positions offset from the shaft center of the externally-toothed gear 24 so as to be equidistant from each other. The carrier pins 42 are inserted through three of these through holes equidistant from each other by 120°, and internal pins 40 are inserted through the remaining nine pins. Gear teeth of waveform are formed at the outer circumference of the externally-toothed gear 24. As the gear teeth move on the internal gear pins 28A of the internally-toothed gear 28, maintaining contact with the internal gear pins 28A, the externally-toothed gear 24 is capable of oscillating within a plane defined about a central axis normal to the plane. The externally-toothed gear 26 is similarly structured as the externally-toothed gear 24 except that there is a phase difference of 180°.

The casing 30 of the reducer 10 is rotatably supported by the first carrier body 34 and the second carrier body 38 secured to the vehicle frame, via a pair of main bearings 46 and 47. A wheel member 48 is jointed via bolts 49 to the lateral face of the casing 30 away from the vehicle. A tire 50 of a forklift (not shown) is mounted to the wheel member 48. The reducer 10 is accommodated within an axial range of the tire 50 (within the range denoted by dashed-two dotted lines of FIG. 1).

The input shaft 16 of the reducer 10 is rotatably supported by the first carrier body 34 and the second carrier body 38 via a pair of angular contact bearings 52 and 54 in DF (face to face) arrangement.

The IPM motor 12 is provided with a stator 64 and a rotor 66 each configured with magnetic steel sheets. A plurality of air gaps 66A extending in the axial direction are formed in the magnetic steel sheets composing the rotor 66. Permanent magnets 76A and 7B are embedded in the gaps. IPM motors, in which permanent magnets are embedded in the rotor, have higher efficiency than SPM motors, in which permanent magnets are attached to the surface of the rotor, and are suitable as a motor to drive a forklift. The magnetic steel sheets composing the rotor 66 are integrated with each other by bolts 67 and are integrated with an output shaft 70 via an engagement part (not shown). The side of the output shaft 70 toward the vehicle is rotatably supported via a bearing 82 by an extension 60A extending inward from a motor casing 60. The side of the output shaft 70 away from the vehicle is jointed by the input shaft 16 of the reducer 10 via a spline 70a.

A stator 64 is fixed to the motor casing 60. A coil for generating a magnetic field is wound around the stator 64. The parts of the coil that are folded back to provide a winding extend axially from the ends of the stator 64 as coil ends 68A and 68B.

The brake mechanism 14 puts a brake on the rotation of the output shaft 70. The brake mechanism 14 is accommodated interior to the coil end 68A of the coil wound around the stator 64 in the radial direction. The brake mechanism is provided with a multi-plate brake 78 having a plurality of friction plates. The friction plates of the multi-plate brake 78 comprises a plurality of (four, in the illustrated case) fixed friction plates 78A and a plurality of (three, in the illustrated case) rotatable friction plates 78B.

The fixed friction plates 78A are fixed in the circumferential direction between a brake piston 84 located to block the rear end of the motor casing 60 of the IPM motor 12 and the extension 60A of the casing 60 by thorough pins (not shown). The fixed friction plates 78A are movable in the axial direction along the thorough pins.

Meanwhile, the rotatable friction plates 783 are built in the output shaft 70, which is rotated as one piece with the rotor 66, and is rotatable as one piece with the output shaft 70. A spline 70B is formed in the axial direction at the outer circumference of the output shaft 70. The inner circumferential ends of the rotatable friction plates 783 are engaged with the spline 70B. This allows the rotational friction plates 78B to be integrated with each other in the circumferential direction via the output shaft 70 and the spline 70B and to be movable in the axial direction of the output shaft 70. A friction sheet (not shown) is adhesively attached to the surface of each of the rotatable friction plates 78B.

The brake piston 84 is located to slide in a cylinder that communicates with a hydraulic mechanism (not shown) via an oil passage 86. When the operator of the forklift performs a braking maneuver, pressurized oil is supplied from the hydraulic mechanism to the cylinder via the oil passage 86, and the brake piston 84 pressurizes the fixed friction plate 78A closest to the vehicle.

The rotor 66 of the IPM motor 12, the output shaft 70, the friction plates 78A, 78B of the brake mechanism 14, the input shaft 16 of the reducer 10, the casing 30 (output shaft of the reducer 10), and the wheel member 48 are located coaxially.

The IPM motor 12 and the brake mechanism 14 are formed as wet mechanisms, and the interior spaces of the reducer 10, the IPM motor 12, and the brake mechanism 14 communicate with each other to form a single, closed space. The lubricant is sealed in this space and can flow through the space.

A description will now be given of the operation of the power transmission 100 performed when the IPM motor 12 is driven.

When the operator of the forklift maneuvers the forklift to move forward or backward, the rotor 66 and the output shaft 70 are rotated relative to the stator 64 of the IPM motor 12. The rotation of the output shaft 70 is transmitted to the input shaft 16 of the reducer 10 via the spline 70A. When the input shaft 16 is rotated, the outer circumferences of the eccentric bodies 18 and 20 move eccentrically, causing the externally-toothed gears 24 and 26 to oscillate via the roller bearings 21 and 23. The oscillation causes the positions of meshing between the outer teeth of the externally-toothed gears 24, 26 and the internal gear pins 28A, 28B of the internally-toothed gear 28, respectively, to be shifted successively.

The difference in the number of teeth between the externally-toothed gears 24, 26 and the internally-toothed gear 28 is defined to be "one". The rotation of the externally-toothed gears 24 and 26 is restrained by the internal pins 40 fixed to the first carrier body 34, which is fixed to the vehicle frame. Therefore, each time the input shaft 16 is rotated 360°, the internally-toothed gear 28 is rotated relative to the externally-toothed gears 24 and 26, the rotation of which is restrained, by an angle defined by the difference in the number of teeth. As a result, the rotation of the input shaft 16 causes the casing 30 integrated with the internally-toothed gear body 280 at a rotational speed reduced by 1/(the number of teeth of the internally-toothed gear). The rotation of the casing 30 causes the tire 50 of the forklift to be rotated via the wheel member 48 fixed to the casing 30 by the bolts 49.

A description will now be given of the braking operation of the power transmission device 100 performed by the brake mechanism 14.

When the operator of the forklift performs a braking maneuver, pressurized oil is supplied from the hydraulic mechanism to the cylinder via the oil passage 86, causing the brake piston 84 to move away from the vehicle (toward right in the figure) within the cylinder. As a result, the fixed friction plate 78A closest to the vehicle is pressurized by the brake piston 84 to move away from the vehicle. Then, the plurality of fixed friction plates 78A and the rotatable friction plates 78B come into contact with each other successively with a strong force. As described above, the fixed friction plates 78A are fixed in the circumferential direction via the through pins, and the rotatable friction plates 78B are integrated with the output shaft 70 in the circumferential direction via the spline 70B built in the output shaft 70. Therefore, as a result of the friction plates 78A and the rotatable plates 78B being in strong contact with each other via the friction sheets adhesively attached to the rotatable friction plates 78B, the brake action of the output shaft 70 is exerted.

When the operator stops the braking maneuver, the supply of the pressurized oil in the cylinder is stopped. Consequently, the restoring force of a spring 84A interposed between the extension 60A and the brake piston 84 returns the brake piston 84 toward the vehicle, causing the fixed friction plates 78A to return to the initial axial positions. In association with this, the rotatable friction plates 78B also return to the initial axial positions, causing the fixed friction plates 78A to lose contact with the rotatable friction plates 78B and causing the brake action to disappear.

A description will now be given of how metal powder in the lubricant oil is captured using magnetic flux generated by the permanent magnet in the rotor, which is one of characteristic features of the embodiment.

As shown in FIG. 1, end plates 72 and 74 for preventing the permanent magnets embedded in the rotor from being dislocated while in rotation are fitted to the respective axial end faces of the rotor 66. The end plates are made of stainless steel or aluminum.

Figure 2:
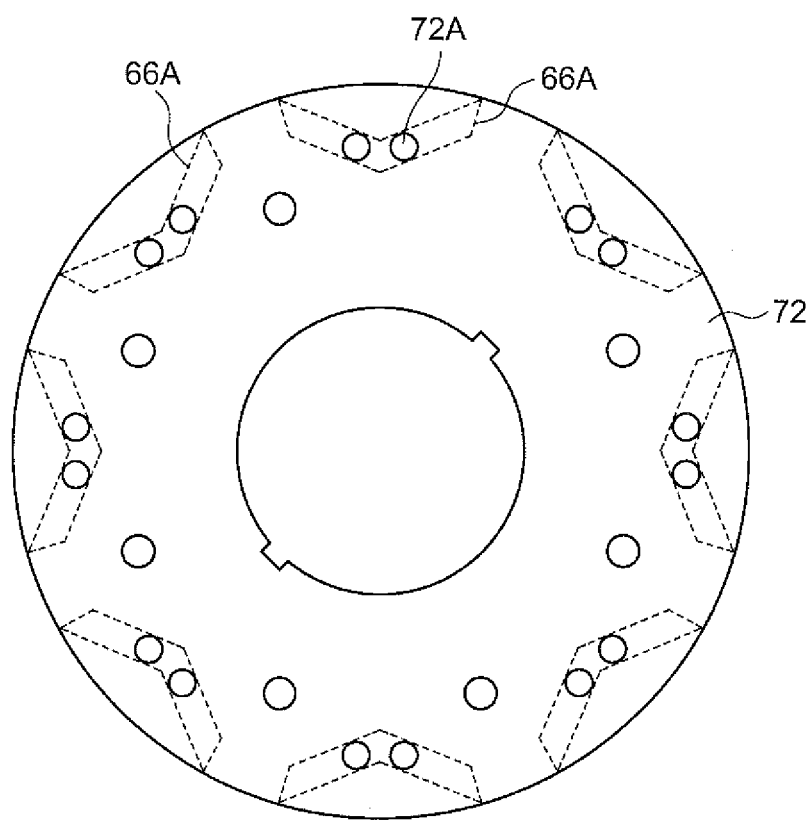
FIG. 2 is a top view of an end plate of FIG. 1.

FIG. 2 is a top view of the end plate 72 away from the brake mechanism 14. A through hole 72A is formed in each of positions corresponding to permanent magnets 76B (air gaps 66A) formed in the rotor. By forming the rotor end face with through holes that allow direct contact between the permanent magnet and the lubricant oil, the magnetic flux from the permanent magnet can exude through the rotor end face and capture metal powder created mainly as a result of a sliding motion between components in the reducer. This can mitigate abnormal abrasion between components caused as a result of metal powder in the lubricant oil being caught in the sliding portion and can therefore extend the life of the reducer and the brake mechanism.

The diameter of the through holes 72A is illustrated as being substantially identical to the width of the air gaps 66A but may be slightly smaller than the width of the gaps. Two or more through holes may be formed per a single air gap.

According to this embodiment, the through holes 72A are formed in the end plate 72 at the end face of the rotor that does not face the brake mechanism 14, the end plate 74 at the end face that faces toward the brake mechanism 14 is not provided with such through holes. This ensures that the leakage magnetic flux from the rotor end face that does not face the brake mechanism is larger than the leakage magnetic flux at the end face that faces toward the brake mechanism. Therefore, the metal powder in the lubricant is attracted more toward the end face away from the brake mechanism. This prevents a large amount of metal powder from flowing around the friction plates of the brake mechanism and prevents abnormal abrasion of the friction plates.

Described above is an explanation based on an exemplary embodiment. The embodiment is intended to be illustrative only and it will be obvious to those skilled in the art that various modifications to constituting elements and processes could be developed and that such modifications are also within the scope of the present invention.

It has been described that only one of the end plates is formed with through holes in the embodiment described above. However, other structures may also be used to ensure that the leakage magnetic flux from the rotor end face that does not face the brake mechanism is larger than that of the end face that faces toward the brake mechanism. A description will now be given of such examples.

Figure 3:
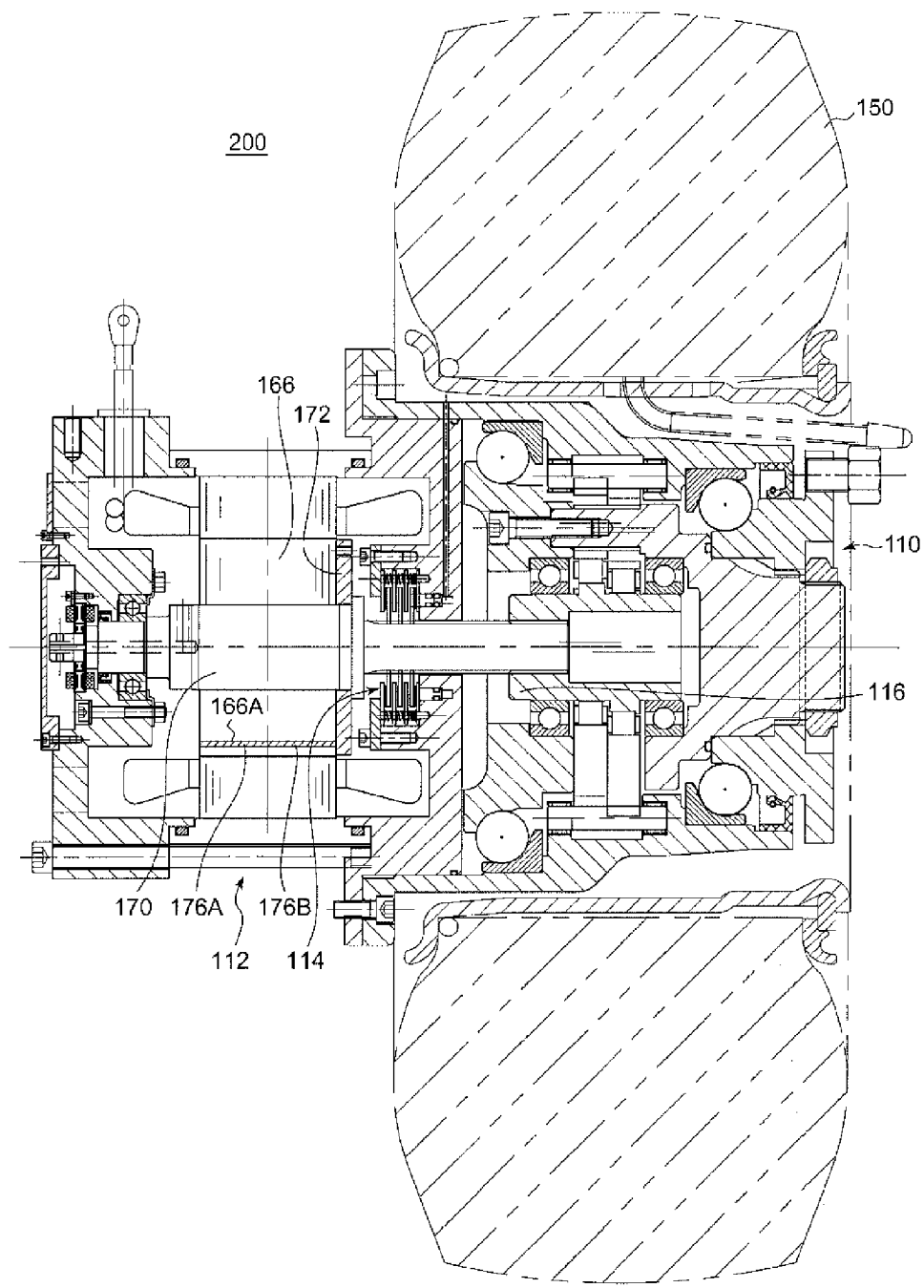
FIG. 3 shows the structure of a power transmission device of a structure in which a brake mechanism is provided between the IPM motor and the reducer.

FIG. 3 shows the structure of a power transmission device 200 according to one example. The basic structure and the operation are the same as those of the power transmission device 100 shown in FIG. 1 except that a brake mechanism 114 is provided between the reducer 110 and the IPM motor 112, so that a detailed description will be omitted.

As in FIG. 1, air gaps 166A extending in the axial direction are formed in a rotor 166 of the IPM motor 112. Permanent magnets 176A and 176B are embedded in the air gaps. In the illustrated example, only one of the axial end faces of the rotor 166 that faces toward the brake mechanism 114 is provided with an end plate 172. The end face that does not face the brake mechanism is not provided with an end plate. By providing only one of the rotor end faces with an end plate, it is ensured that the leakage magnetic flux from the rotor end face that does not face the brake mechanism is larger than the leakage magnetic flux at the end face that faces toward the brake mechanism.

In an alternative example, the thickness of one end plate provided at one rotor end face may be different from that of the other end face so as to create a difference in the amount of leakage magnetic flux from the rotor end faces. In other words, the end plate at the end face that faces toward the brake mechanism may be thicker and the end plate that does not face the brake mechanism may be thinner.

In a still alternative example, the material of the end plate provided at one rotor end face may be different from that of the other end face so as to create a difference in the amount of leakage magnetic flux from the rotor end faces. For example, the end plate that faces toward the brake mechanism may be formed of a nonmagnetic material and the end plate that does not face the brake mechanism may be formed of a magnetic material.

In order to increase the chance that metal powder is captured more at the end plate away from the brake mechanism, means may be provided to guide the lubricant toward the neighborhood of the end plate. Generally, when a rotor is rotated in the lubricant, a flow that draws the lubricant toward the surface of the rotor is generated due to the viscocity of the lubricant. The phenomenon can be exploited such that the outer surface of the rotor or the inner surface of the stator may be provided with skews to create a flow toward a space away from the brake mechanism when the rotor is rotated in a particular direction.

Preferably, the particular direction in which the rotor is rotated is a direction more frequently used than the other direction because this will increase the efficiency of capturing metal powder. In the case of a forklift, the particular direction of rotation of the rotor is a direction of rotation corresponding to the forward movement of the forklift.

Instead of or in addition to rotor or stator skews, means may be provided that positively guides the lubricant. For example, the output shaft 70 may be formed to be hollow and through holes that allow the lubricant to flow in the output shaft may be formed in the neighborhood of the end faces of the rotor. When the rotor with this structure is rotated, the lubricant can be drawn to the hollow portion of the output shaft 70 from the through hole located toward the brake mechanism and discharged from the through hole located away from the brake mechanism. Alternatively, the output shaft 70 may be provided with a fin that generates a flow from the side toward the brake mechanism to the opposite side.

It has been described that a reducer mechanism of oscillating and internally meshing type is used in the embodiment described above. However, the reducer mechanism according to the invention is not limited to the oscillating and internally meshing type. For example, the reducer may have other mechanisms such as a simple planetary gear reducer mechanism. The reducer may not necessarily have a single-stage reducer mechanism in which the input shaft and the output shaft are coaxial. Alternatively, the reducer mechanism may comprise multiple shafts or multiple stages.

It should be understood that the invention is not limited to the above-described embodiment, but may be modified into various forms on the basis of the spirit of the invention. Additionally, the modifications are included in the scope of the invention.

Priority is claimed to Japanese Patent Application No. 2012-037240, filed Feb. 23, 2012, the entire content of which is incorporated herein by reference.

What is claimed is:

1. A power transmission device comprising:
   a motor including a rotor having a first axial side, a second axial side opposite the first axial side, a permanent magnet embedded therein and a stator, and configured to generate a rotational force;
   a reducer configured to transmit the rotational force of the motor; and
   a wet brake mechanism provided on the first axial side of the rotor and configured to brake the rotation of the motor,
   wherein spaces accommodating the motor, the reducer, and the wet brake mechanism communicate with each other so that lubricant oil can flow through the spaces, and
   wherein a leakage magnetic flux at a second axial end face on the second axial side of the rotor is greater than a leakage magnetic flux at a first axial end face on the first axial side of the rotor having the wet brake mechanism.

2. The power transmission device according to claim 1, wherein
   only the first axial end face of the rotor is provided with an end plate.

3. The power transmission device according to claim 1, wherein each of the first and second axial end faces of the rotor is provided with an end plate, and the end plate on the second axial end face is formed with a through hole at a position corresponding to the permanent magnet.

* * * * *